United States Patent [19] [11] 3,865,735
Clark et al. [45] Feb. 11, 1975

[54] OVERBASED BRANCHED CHAIN ALIPHATIC SULFONATE WATERFLOOD ADDITIVES

[75] Inventors: Charles R. Clark; M. Duane Gregory, both of Ponca City, Okla.; Delmar D. Krehbiel, Lubbock, Tex.; Claud D. Butler; Carl D. Kennedy, both of Ponca City, Okla.

[73] Assignee: Continental Oil Company, Ponca City, Okla.

[22] Filed: Jan. 19, 1973

[21] Appl. No.: 324,909

[52] U.S. Cl. ........ 252/8.55 D, 260/513 R, 166/275, 166/270
[51] Int. Cl. ............................................. C09k 3/00
[58] Field of Search ............ 252/8.55 D; 260/513 R; 160/275, 270

[56] References Cited
UNITED STATES PATENTS
2,999,812   9/1961   Krahler ......................... 252/8.55 D
3,721,707   3/1973   Strauss et al. ................... 252/8.55 D Primary Examiner—Benjamin R. Padgett
Assistant Examiner—B. Hunt
Attorney, Agent, or Firm—Ronald J. Carlson

[57] ABSTRACT

Overbased branched chain aliphatic sulfonates are prepared by adding an excess of a base component such as an alkali metal hydroxide, ammonium hydroxide, or an alkali metal carbonate to a sulfonate derived by sulfonating a branched chain alkene such as a propylene tetramer and neutralizing the sulfonic acid thus formed with the base component. The overbased sulfonate is injected into a petroliferous formation to improve a water flood operation. In one embodiment overbasing base component is injected as a slug subsequent to injection of the sulfonate.

4 Claims, No Drawings

OVERBASED BRANCHED CHAIN ALIPHATIC SULFONATE WATERFLOOD ADDITIVES

BACKGROUND OF THE INVENTION

1. Field of the Invention

This invention relates to an improved anionic water flood additive. In one aspect the invention relates to the use of the anionic water flood additive for recovery of hydrocarbons from petroliferous subterranean strata. In yet another aspect, this invention relates to a process for the recovery of a viscous oil from a low permeability formation by the use of an aqueous mixture containing from about 0.5 to 25 weight percent of an overbased branched chain aliphatic sulfonate having about 7 to about 18 carbon atoms per molecule.

2. Brief Description of the Prior Art

A large percentage of the oil in a petroliferous strata is held within the rock of the strata by the surface forces between the rock, the oil, and the formation water. As a result, a substantial portion of this oil usually remains in the rock even when wells traversing the strata are no longer productive. Various secondary recovery techniques, such as thermal recovery, gas injection and water flooding, have been suggested for the recovery of this fixed oil which remains in the formation after it can no longer be produced by primary recovery methods. Of the secondary recovery techniques, water flooding is quite commonly chosen, and a multitude of methods have been suggested for improving the efficiency and economy obtained from the practice. Such methods frequently include incorporation of a water-soluble surfactant in the water flood. Typical surfactants which have been proposed for this purpose include alkyl pyridinium salts, sodium lauryl sulfate, certain sulfonates, glycosides, sodium oleates, quaternary ammonium salts and the like. The use of such surfactants has arisen because it is widely recognized that a low interfacial tension between the surfactant flood water and the reservoir crude is essential to the improvement of recovery efficiencies.

Recently it has been proposed that nonionic surfactant solutions, such as a polyoxyethylene-polyoxypropylene copolymer containing solution be injected into the formation through a first of at least two well bores to thereby displace the hydrocarbons toward a second well bore. The nonionic surfactant flood is then followed by the injection of a slug of aqueous caustic into the formation through the first well bore to displace the hydrocarbon and the surfactant toward the second bore. The caustic slug has a basicity of at least 1.5 pH levels greater than that of the native formation water. However, the use of the nonionic surfactant has not fully met the need for a desirable water flood additive surfactant composition, and new compositions are constantly being sought which will allow one to recover the residual oil remaining in the formation. Further, the surfactant ingredients of the prior art have suffered from lack of availability or cost, and thus have not fully satisfied this long felt need.

OBJECTS OF THE INVENTION

An object of the invention is to provide an improved water flood additive and method for using same in the secondary recovery of hydrocarbons from oil bearing formations.

Another object of the present invention is to provide an improved water flood additive which is inexpensive and readily available in sufficient quantities to satisfy present and future needs.

Another object of the invention is to provide a water flood additive composition which is effective in recovering the tertiary oil in the formation and which can be readily prepared.

These and other objects, advantages, and features of the invention will become apparent to those skilled in the art from a reading of the following detailed description.

SUMMARY OF THE INVENTION

According to the present invention we have now found an improved anionic water flood additive which comprises an overbased branched chain aliphatic sulfonate derived from a non-linear alkene containing from about 7 to about 18 carbon atoms per molecule.

Further, according to the invention we have found that when employing an aqueous solution containing from about 0.5 to 25 weight percent of said anionic water flood additive that hydrocarbons in substantial yields can be recovered from petroliferous formations.

One method of employing the anionic water flood additive composition of the present invention includes the step of injecting a slug of an aqueous mixture containing from about 0.5 to 25 weight percent of the overbased sulfonate into a petroliferous formation to thereby displace the hydrocarbon from the formation so that one can recover the displaced hydrocarbon. Additional hydrocarbon can be recovered, if desired, by injecting an effective amount of a slug of aqueous base component into the petroliferous formation after the overbased slug has been injected.

Another method of removing the hydrocarbons from a petroliferous formation is by injecting a first slug of an aqueous mixture containing from about 0.5 to 25 weight percent of the sulfonate into the petroliferous formation followed by an effective amount of base component so that the overbased composition is produced in situ by the contacting of the sulfonate slug and the base component slug.

DESCRIPTION OF THE PREFERRED EMBODIMENTS

As previously stated, the present invention relates to an improved anionic water flood additive and to a method of using same for the recovery of hydrocarbons from a petroliferous formation. The anionic water flood additive is an overbased branched chain aliphatic sulfonate which can be derived from a non-linear alkene and which contains about 7 to about 18 carbon atoms per molecule. The term non-linear alkene used herein, which when sulfonated and overbased with base component produces the desired water flood additive of this invention, can be a branched chain product resulting from the catalytic polymerization of propylene. Propylene tetramer is a common designation for one such suitable alkene product.

Propylene can have an origin in an oil refinery as a by-product from catalytic cracking of heavy stock for the production of gasoline. Such propylene product often contains about 50 percent propane and other saturated hydrocarbons. This is suitably employed to produce the desired branched chain (non-linear) mono-olefin (alkene) products for use in the preparation of the additive composition of the present invention.

One method for producing such non-linear alkene product is by heating the impure stream and injecting same into a catalytic chamber which contains as a catalyst such as kieselguhr impregnated with phosphoric acid or quarz chips coated with phosphoric acid. Polymerization of the propylene is then carried out at the appropriate polymerization conditions to produce the desired product. For example, when the desired product is one containing 12 carbon atoms, a product commonly referred to as propylene tetramer, the polymerization conditions are approximately 1000 p.s.i.g. pressure and 200°C temperature.

The product from the polymerization unit is then fractioned to remove the unreacted propane, and other undesired constituents from the desired polymerization product which is to be sulfonated and overbased as herein after set out in detail.

While the above process for the preparation of non-linear alkene products has been set out in some detail, it is to be understood that any other suitable method for producing such non-linear alkenes containing about 7 to 18 carbon atoms per molecule is suitable to prepare the initial feed stock.

It is, however, essential that the alkene employed to produce the anionic water flood additive of the present invention be non-linear, i.e., branched, in configuration. Such is borne out in the examples set forth hereinafter which show that a product derived from a linear alkene did not produce the desired oil recovery whereas ones derived from non-linear alkenes did. While any suitable non-linear alkene containing from 7 to 18 carbon atoms per molecule can be employed, especially desirable results have been obtained wherein the alkene employed has about 8 to about 14 carbon atoms per molecule, mixtures of such alkenes can be employed as well as pure materials. Examples of suitable non-linear alkenes are the branched heptenes, octenes, nonenes, decenes, dodecenes, octadecenes, mixtures of same and the like.

The non-linear alkenes so described are employed to produce their corresponding sulfonates. Sulfonation procedures are well-known in the art, and may be carried out by any one of several methods using $SO_3$, mixtures of $SO_3$ and $SO_2$, or organic sulfonating agents. Furthermore, the sulfonation can be carried out by either a batch-type process or a continuous falling film reactor process. However, it is necessary that an effective amount of the sulfonating agent be employed to ensure substantially complete conversion of the alkenes to the corresponding sulfonate precursors. When $SO_3$ is the sulfonating agent the mole ratio of $SO_3$ to non-linear alkene is generally about 1:1 to 1.5:1.

As previously stated, the improved anionic water flood additive of the present invention is an overbased sulfonate derived from a non-linear alkene containing from about 7 to 18 atoms per molecule.

Overbased sulfonates, as this term is employed in this application, are defined to be mixtures of sulfonates plus base component wherein the ratio: "weight of excess base component/weight of sulfonate" has a value of about 0.03 to about 2.0. Excess base component is that amount of base component which is not employed to hydrolyze the sultone or neutralize the sulfonic acid precursor to the sulfonate. Particularly desirable results are obtained when the ratio has a value of about 0.20 to about 1.0. The term "sulfonate" as employed to determine the "ratio" includes only the branched aliphatic sulfonates derived from non-linear alkenes.

Neutralization, conversion, or overbasing of the precursors to the sulfonates with base component can also be carried out in any one of several methods well-known in the art.

The term "base component" as employed in this application includes alkali metal hydroxides, ammonium hydroxide, and alkali metal salts such as the alkali metal carbonates which are capable of converting the sultone and/or sulfonic acid precursors to the sulfonates. Examples of such base components include sodium hydroxide, potassium hydroxide, lithium hydroxide, ammonium hydroxide, sodium carbonate, sodium bicarbonate, potassium carbonate, and the like. Especially desirable results are obtained when the alkali metal hydroxides are used.

When one merely neutralizes the sulfonates and injects an aqueous solution of the neutralized products into the formation, one must add a sufficient amount of base component in a second slug to insure that the water flood additive composition formed in situ in the formation is overbased in the prescribed ranges.

In describing the use of the anionic water flood additive of the present invention, two methods of injecting said additive into the petroliferous strata will be discussed. However, it should be understood that neither method is preferred over the other and that the particular method chosen will depend to a large extend upon the facilities available at the well site.

One method of employing the anionic water flood additive composition of the present invention is to inject an aqueous slug containing from about 0.5 to 25 weight percent of the sulfonate derived from the non-linear alkene through a well bore into the petroliferous subterranean strata from which the additional hydrocarbon is to be removed. After the sulfonate slug has thoroughly been dispersed into the strata an effective amount of aqueous base component mixture in the form of a second slug is introduced into the strata to form an aqueous mixture in situ in the subterranean strata containing from about 0.5 to 25 weight percent of the overbased water flood additive composition and having a ratio in the range defined. If sufficient base component is not added to reach the lower minimum ratio of about 0.03, desirable results are not obtained. Likewise, problems of viscosity and handling of materials are encountered when the amount of overbasing is beyond the upper limit of about 2.0.

The second system which can be employed in using the anionic water flood additive composition of the instant invention involves producing the overbased sulfonate on the surface, admixing with water or brine and then injecting the resulting aqueous mixture containing about 0.5 to about 25 weight percent of the overbased sulfonate directly into the petroliferous subterranean strata as one slug. When employing this procedure the same limitations as to ratio apply as to the process heretofore described.

Additional tertiary oil can be recovered by injecting an effective amount of an aqueous base component mixture into the formation which has previously been contacted with overbased sulfonate composition. The amount and concentration of the aqueous base component containing mixture employed can vary widely. However, desirable results have been obtained wherein the concentration of the base component in the mixture ranges from about 0.5% to 50% weight percent and the amount of mixture injected into the formation is from about 10% to 1000 volume percent, based on the total amount, of the sulfonate containing slug previously injected into the formation.

As previously stated, the composition injected into the oil bearing formation is an aqueous mixture containing from about 0.5 to 25 weight percent of the overbased water flood additive. Particularly desirable results have been obtained wherein the aqueous mixture injected into the formation contains from about 6 to 15 weight percent of said additive.

Difficulties are sometimes encountered in the formation of the aqueous mixture due to the solubility characteristics of the anionic water flood additive compositions of the present invention. When such solubility problems are detected one can add an effective amount of any suitable water soluble surfactant. The amount of water soluble surfactant required in such instances will vary widely but will generally be within the range of from about 0.5 to 25 weight percent, based on the weight of the total composition. Examples of suitable water soluble surfactants are aryl sulfonates, such as sodium benzenesulfonate, sodium xylenesulfonate, sodium toluenesulfonate, sodium hexylbenzenesulfonate, sodium octylbenzenesulfonate and the like; alcohol or phenol ethoxylates wherein the molecule contains from about 30 to 90 weight percent ethylene oxide and the alcohol moiety contains from about 2 to 20 carbon atoms. Any sulfonates which are employed as water soluble surfactants are not taken into account in determining the ratio: weight of excess base component/weight of sulfonate previously referred to. The sulfonates that are referred to in the ratio include only the branched aliphatic sulfonates derived from branched chain alkenes.

In order to more fully explain the present invention the following examples are given. However, it is to be understood that the examples are not intended to function as limitations on the invention as described and claimed hereafter.

EXAMPLE 1

A series of experiments were conducted to evaluate the oil recovery properties of the anionic water flood additive of the present invention. In each experiment 12 inches × 2 inches × 2 inches Berea sandstone cores were evacuated under vacuum and then saturated with 5 weight percent NaCl brine. The brine saturated cores were reduced to irreducible water saturation with 80 Pale-oil and then water-flooded to residual oil saturation with a sodium chloride brine solution. The water flood additives were then injected into the cores as aqueous mixtures containing 15% by weight of sulfonate and 4% by weight of NaOH and the tertiary water flood was conducted at 40 cc/per hour, a flow rate equivalent to 6–7 feet per day to determine their effectiveness as oil recovery additives. All of the oil recovery runs were conducted at 130°F. and the column entitled $\Delta S$ is the volume of oil produced as percent of pore volume. Further, the column entitled weight percent NaOH is the weight percent of free NaOH present above that required to neutralize the water flood additive, e.g. the amount overbased.

Table I

OIL RECOVERY DATA FOR BRANCHED ALIPHATIC SULFONATES

| Run umber | Sulfonate(4) | Average Carbon Number Distribution/ Molecule in Non-linear Alkene | Formulation Wt. % Sulfonate | Wt.% NaOH | Ratio(1) | $\Delta S$ (% PV) at 130°F and 40 cc/hr. |
|---|---|---|---|---|---|---|
| 1 | Propylene Polymer Sulfonate(2) | 9 | 15.0 | 0 | 0 | 4.6 |
| 2 | Propylene Polymer Sulfonate(2) | 9 | 15.0 | 4 | 0.266 | 8.4 |
| 3 | Propylene Polymer Sulfonate(2) | 12 | 15.0 | 0 | 0 | 4.6 |
| 4 | Propylene Polymer Sulfonate(2) | 12 | 15.0 | 4 | 0.266 | 8.4 |
| 5 | 1-Hexadecene Sulfonate(3) | 16 | 15.0 | 4 | 0.266 | 1.8 |

(1)Ratio is: weight of excess base component/weight of sulfonate.
(2)Samples 1 – 4 were prepared by the catalytic polymerization of propylene, each polymer (alkene) contains 1 double bond and is highly branched.
(3)Linear olefin sulfonate.
(4)Procedure for sulfonation of branched alkenes for water flood additive use.
To a stirred reactor were charged:
    100 g alkene (dodecene as example) (0.41 moles)
    46 g SO$_3$ (0.57 moles)
The alkene was placed in a batch reactor fitted with a gas introduction tube at the bottom. The SO$_3$ was introduced in as dilute gas stream of dry air (about 5% SO$_3$ in air) over a period of about one hour. The temperature was held at about 40–50 °C throughout the reaction. Mixing was provided by the air stream passing through the system.

Analysis of the resulting product was as follows:
| | |
|---|---|
| % Active | 27.1 |
| % Oil | 10.5 |
| % Inorganic Salt | 9.2 |
| % Water | Balance |

The above data clearly demonstrate use of the anionic water flood additives of the instant invention. Further, the data demonstrate that by employing an aqueous mixture containing 15 weight percent of a sulfonate obtained from non-linear alkenes, wherein said sulfonate had been overbased to a ratio of 0.27, gave a tertiary oil recovery ($\Delta S$) of about 8.4 whereas, the same composition but without the excess base component gave an oil recovery of only 4.6. In addition, an overbased sulfonate derived from the $C_{16}$ linear olefin hexadecene gave substantially no oil recovery.

Having thus described the invention, we claim:

1. An anionic waterflood additive comprising a sulfonate derived from a non-linear alkene having about 7 to about 18 carbon atoms plus an overbasing amount of base component; wherein the ratio: weight of excess base component/weight of sulfonate is about 0.03 to about 2.0; the base component being an alkali metal hydroxide, ammonium hydroxide, or an alkali metal carbonate.

2. The anionic water flood additive of claim 1 wherein the sulfonate is derived from a non-linear olefin polymer containing about 8 to about 14 carbon atoms per molecule.

3. The anionic water flood additive of claim 2 wherein the ratio is about 0.20 to about 1.0; and wherein the base component is NaOH, LiOH, KOH, $Na_2CO_3$, or $Li_2CO_3$.

4. The anionic water flood additive of claim 3 wherein the sulfonate is derived from a non-linear olefin polymer wherein the average carbon chain length of the polymer is about 9 to about 12 carbon atoms; and wherein the sulfonate is a sodium sulfonate and is overbased with sodium hydroxide.

* * * * *